United States Patent
Krishnan et al.

(10) Patent No.: US 11,691,661 B2
(45) Date of Patent: Jul. 4, 2023

(54) DEVICE FOR A STEERING SYSTEM OF A MOTOR VEHICLE

(71) Applicant: ZF Automotive Germany GmbH, Alfdorf (DE)

(72) Inventors: Sridharan Krishnan, Neuss (DE); Robert Kolloch, Mönchengladbach (DE); Eduard Span, Cologne (DE)

(73) Assignee: ZF Automotive Germany GmbH, Alfdorf (DE)

( * ) Notice: Subject to any disclaimer, the term of this patent is extended or adjusted under 35 U.S.C. 154(b) by 260 days.

(21) Appl. No.: 16/843,745

(22) Filed: Apr. 8, 2020

(65) Prior Publication Data
US 2020/0324803 A1    Oct. 15, 2020

(30) Foreign Application Priority Data
Apr. 11, 2019 (DE) .......................... 102019109651.0

(51) Int. Cl.
*B62D 3/12* (2006.01)
*F16H 55/28* (2006.01)

(52) U.S. Cl.
CPC ........... *B62D 3/123* (2013.01); *F16H 55/283* (2013.01); *F16H 55/28* (2013.01); *F16H 2055/281* (2013.01)

(58) Field of Classification Search
CPC ... B62D 3/123; F16H 55/28; F16H 2055/281; F16H 55/283; F16H 55/286
USPC .......................................................... 74/409
See application file for complete search history.

(56) References Cited

U.S. PATENT DOCUMENTS

| | | | | |
|---|---|---|---|---|
| 4,936,157 A | * | 6/1990 | Kotake | F16H 55/283 74/498 |
| 6,076,417 A | * | 6/2000 | Engler | B62D 3/12 280/267 |
| 2002/0162412 A1 | * | 11/2002 | Harer | F16H 55/283 74/422 |
| 2005/0041895 A1 | * | 2/2005 | Pionnier | B62D 3/123 384/42 |
| 2005/0257635 A1 | * | 11/2005 | Damore | F16H 55/283 74/422 |

(Continued)

FOREIGN PATENT DOCUMENTS

DE    602005002341 T2    5/2008
DE    102011002463 A1 *  1/2011

(Continued)

OTHER PUBLICATIONS

EP 1681494 A (Bertrand Paris) Jul. 19, 2006. [online] [retrieved on Mar. 18, 2022]. Retrieved from: ProQuest Dialog. (Year: 2006).*

(Continued)

*Primary Examiner* — Joseph Brown
(74) *Attorney, Agent, or Firm* — Robert James Harwood

(57) ABSTRACT

A device for a steering system of a motor vehicle for pressing a toothed rack against a drive pinion is specified, the device having a housing and a thrust piece which is mounted displaceably in the housing and which has a circumferential wall which is in contact with the housing, the thrust piece having, on its circumferential wall, at least one depression which runs in a circumferential direction at least in certain portions and which delimits a hollow chamber arranged between thrust piece and housing.

16 Claims, 5 Drawing Sheets

(56) References Cited

U.S. PATENT DOCUMENTS

| | | | | |
|---|---|---|---|---|
| 2007/0028711 A1* | 2/2007 | Beutler | ............ | B62D 3/123 |
| | | | | 74/409 |
| 2009/0038429 A1* | 2/2009 | Hirose | ............ | B62D 3/123 |
| | | | | 74/498 |
| 2011/0175311 A1* | 7/2011 | Tanaka | ............ | F16H 55/283 |
| | | | | 74/29 |
| 2014/0013901 A1* | 1/2014 | Urbach | ............ | B62D 3/123 |
| | | | | 74/606 R |
| 2017/0037952 A1* | 2/2017 | Kikuchi | ............ | F16H 55/28 |
| 2018/0094715 A1* | 4/2018 | Vizier | ............ | B62D 3/123 |
| 2018/0201304 A1* | 7/2018 | Miyoshi | ............ | B62D 5/0403 |
| 2019/0135329 A1* | 5/2019 | Feldpausch | ............ | B62D 3/123 |

FOREIGN PATENT DOCUMENTS

| | | | |
|---|---|---|---|
| DE | 102009028031 A1 | | 2/2011 |
| DE | 102012107501 A1 | * | 8/2012 |
| EP | 1681494 A1 | * | 12/2005 |
| EP | 1882622 A1 | | 1/2008 |

OTHER PUBLICATIONS

DE 102011002463 A1 (Klaus Noder) Jan. 5, 2012. [online] [retrieved on Mar. 18, 2022]. Retrieved from: ProQuest Dialog. (Year: 2012).*

Songhan. "DSM Arnite® AV2 390 XT Pet GF50", http://www.lookpolymers.com/polymer_DSM-Arnite-AV2-390-XT-PET-GF50.php. Jul. 26, 2017. Internet Archive [https://web.archive.org/web/20170726103252/http://www.lookpolymers.com/polymer_DSM-Arnite-AV2-390-XT-PET-GF50.php] (Year: 2017).*

* cited by examiner

A-A

DEVICE FOR A STEERING SYSTEM OF A MOTOR VEHICLE

CROSS-REFERENCE TO RELATED APPLICATION

This application claims priority to German Patent Application No. 102019109651.0, filed Apr. 11, 2019, the disclosure of which is incorporated herein by reference in its entirety.

TECHNICAL FIELD

The present invention relates to a device for a steering system of a motor vehicle.

BACKGROUND

A steering system of a motor vehicle commonly comprises a toothed rack, which engages with a drive pinion. In order to ensure that the toothed rack remains in engagement with the drive pinion, it is common for a thrust piece to be provided which is mounted displaceably in a housing and which loads the toothed rack against the drive pinion with a force. Since high forces act on the toothed rack during driving operation, which forces can cause bending of the toothed rack, the thrust piece is in some cases pressed against the housing wall by a force introduced into the thrust piece by the toothed rack. As a result, a high friction force intermittently arises at the contact surface between the thrust piece and the housing, which high friction force adversely affects the mobility of the thrust piece.

SUMMARY

It is therefore an object of the present invention to improve the mounting of the thrust piece in the housing.

Said object is achieved according to the invention by means of a device for a steering system of a motor vehicle for pressing a toothed rack against a drive pinion, the device having a housing and a thrust piece which is mounted displaceably in the housing and which has a circumferential wall which is in contact with the housing, the thrust piece having, on its circumferential wall, at least one depression which runs in a circumferential direction at least in certain portions and which delimits a hollow chamber arranged between thrust piece and housing. In this context, hollow means that the chamber, in particular the depression, is unfilled. This means that no sealing elements, in particular no O-rings, or other elements or materials are arranged in the depression.

By means of the at least one depression, a possible contact area between the thrust piece and housing is reduced. In this way, a friction force which arises in the event of contact and which acts on the thrust piece is reduced in relation to a corresponding thrust piece without depressions. In this way, a mobility of the thrust piece is improved.

In a preferred embodiment, the at least one depression is interrupted in the circumferential direction by at least one rib running in a displacement direction of the thrust piece. The rib serves for stiffening the thrust piece. In this way, the depression can, overall, be formed over as large an area as possible, and at the same time a required stiffness of the thrust piece can be ensured.

For example, the depression is formed in fully encircling fashion on the thrust piece and is interrupted by multiple ribs.

Furthermore, multiple successive depressions may be provided in the displacement direction of the thrust piece.

In this way, virtually the entire circumferential wall of the thrust piece can be provided with one or more depressions, such that it is possible for there to be only an extremely small contact area between the thrust piece and the housing, which is in turn advantageous with regard to the friction force acting on the thrust piece.

In one embodiment, around the at least one depression, there may be arranged a further depression which has a larger area and a smaller depth than the at least one first depression. In other words, the depression may be stepped. In this way, friction between the thrust piece and the housing can be further reduced without a stiffness of the thrust piece being impaired. The additional depression has, for example, a depth of less than 1 mm.

If multiple depressions are provided, the additional depression may completely surround the first depressions with a greater depth. This means that the first depressions are arranged within the additional depression.

The thrust piece preferably comprises a glass-fiber-reinforced plastic. Owing to the plastic that is included, the thrust piece can be produced particularly easily and inexpensively. Furthermore, a thrust piece with plastic or composed of plastic generates less disturbing noises during driving operation than, for example, a thrust piece composed of metal. This is firstly because the plastic is inherently softer, and secondly, in the case of a thrust piece with plastic or composed of plastic, inertial forces of lesser magnitude arise owing to the lower weight. Furthermore, owing to the glass fibers that are included, it is possible for an adequately high strength and stiffness of the thrust piece to be ensured.

On the circumferential wall of the thrust piece, there may be arranged at least one fully encircling ring-shaped depression in which an O-ring is arranged. A generation of noise can be additionally dampened by means of the O-ring. For this purpose, the O-ring may project to a certain extent beyond the circumferential wall.

In one embodiment, a depth of the encircling ring-shaped depression varies in the circumferential direction of the thrust piece. In other words, a cross section through the thrust piece is of undulating form along the encircling ring-shaped depression. This likewise serves for reducing the friction. In particular, owing to the varying depth, a contact area between an O-ring arranged in the depression and the housing is reduced, such that the thrust piece can slide more easily in the housing.

The thrust piece comprises, for example, polyethylene terephthalate, or is composed of polyethylene terephthalate, in particular with a 50% glass fiber fraction. In this way, it is possible to achieve particularly high stiffness and dimensional accuracy. Also, with such a material, the dimensional stability over the service life of the thrust piece is particularly high. Furthermore, with such a material, a low level of moisture absorption arises, in particular of less than 0.1%, and a low level of thermal expansion occurs. All of these factors contribute to an improved mounting of the thrust piece and to a reduction of the friction between thrust piece and housing.

The thrust piece preferably comprises a slide element which provides a contact surface for the toothed rack. The contact surface for the toothed rack may thus have a different material than a main body of the thrust piece. In this way, at the contact surface, a material can be provided which has a particularly low coefficient of friction, which has the advantage that the toothed rack can slide along the contact surface in a particularly effective manner.

For example, the slide element comprises polyamide and/or polytetrafluoroethylene, or is composed of polyamide and/or polytetrafluoroethylene. Additionally, the slide element may comprise carbon fibers, in particular may have a 30% carbon fiber fraction. Such a material has a low coefficient of friction and a low coefficient of thermal expansion, and high resistance to wear.

Additionally, the slide element may have at least one channel-like depression on its contact surface. Said depression serves for example for reducing the contact area between the toothed rack and the slide element and/or for receiving a lubricant, whereby friction between the toothed rack and the slide element is additionally reduced.

In one embodiment, on a surface, facing toward the thrust piece, of the slide element, there is arranged a fastening element which engages into a corresponding recess of the thrust piece and which is clamped in the recess. In this way, the slide piece and the thrust piece can be connected to one another particularly easily.

In an alternative embodiment, the slide element may be formed as a single piece with the main body of the thrust piece, for example by means of a two-component injection molding process.

The thrust piece is hollow in particular proceeding from the side facing toward the slide element, wherein radial ribs extend inward from the circumferential wall. In this way, a spring which is in contact with the thrust piece and which loads the thrust piece against the toothed rack with a force can be mounted securely in the thrust piece.

In order to realize a compact structural form of the device, the thrust piece may be flattened at its edges directed toward the toothed rack. In this way, the thrust piece can terminate flush with a corresponding housing edge.

In a preferred embodiment, on the thrust piece, in particular on an encircling outer wall of the thrust piece, there are provided two oppositely oriented flattened portions which extend over the entire height of the thrust piece. A tool parting point is situated in the region of these flattened portions. By means of the flattened portions, the advantage is achieved that a casting seam or a casting burr does not project beyond an outer diameter of the thrust piece, which likewise contributes to a reduction of the friction between the thrust piece and housing.

BRIEF DESCRIPTION OF THE DRAWINGS

Further advantages and features of the invention will emerge from the following description and from the following drawings, to which reference is made. In the drawings.

DETAILED DESCRIPTION

Figure 1:
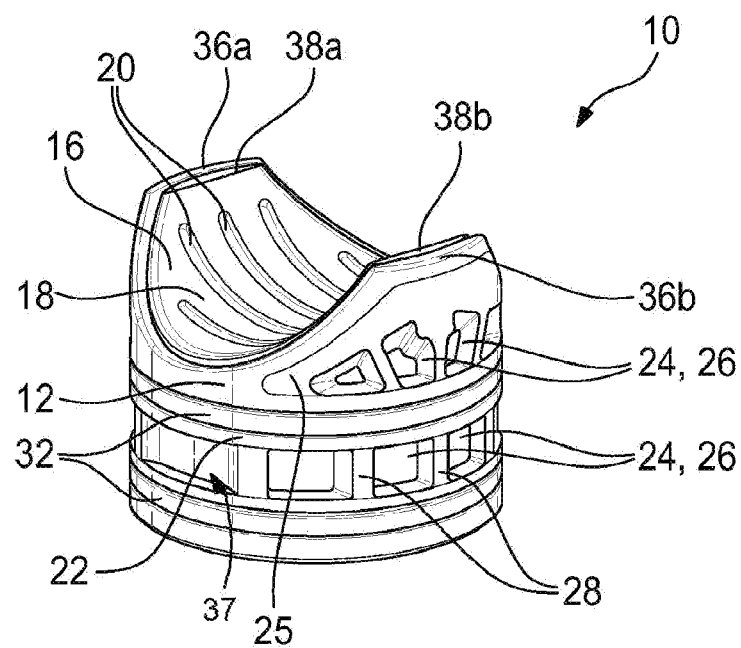
FIG. 1 shows a thrust piece of a device according to the invention.

FIG. 1 shows a thrust piece 10 for a device 1 according to the invention, for a steering system of a motor vehicle, which thrust piece is suitable for pressing a toothed rack against a drive pinion. For the sake of simplicity, the toothed rack and the drive pinion are not illustrated in the figures. Steering systems with a toothed rack and with a drive pinion are however well known from the prior art.

By means of the device 1, it can be ensured that the toothed rack remains in engagement with the drive pinion during driving operation, even if the toothed rack is bent by the forces that arise during driving operation.

Figure 3:
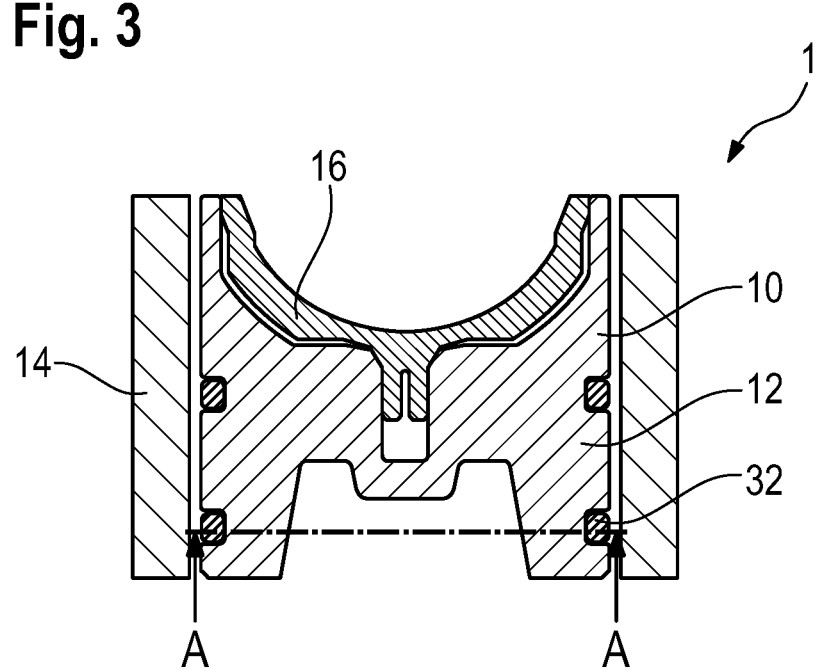
FIG. 3 shows a device according to the invention with the thrust piece from FIG. 1 in a sectional illustration.

The device 1 comprises the thrust piece 10, which is mounted displaceably in a housing 14. The housing 14 is illustrated in FIG. 3.

As seen in a side view, the thrust piece 10 has a semicircular depression which is suitable for receiving a toothed rack. On a side directed away from the toothed rack, the thrust piece 10 can be loaded with a force, in particular a spring force. The thrust piece 10 is thus pressed against the toothed rack and thereby ensures secure engagement between toothed rack and drive pinion.

The thrust piece 10 comprises a slide element 16, which is arranged on a surface, directed toward the toothed rack, of the thrust piece 10, in particular of a main body 12 of the thrust piece 10. The slide element 16 provides a contact surface 18 for a toothed rack.

The slide element 16 may be manufactured from a material with a particularly low coefficient of friction, such that, during operation, the toothed rack can slide back and forth in the thrust piece 10 particularly easily, and static friction between the toothed rack and the thrust piece 10 is substantially prevented.

A suitable material for the slide element 16 is for example polyamide or polytetrafluoroethylene, or a mixture of both materials, wherein the slide element may additionally comprise carbon fibers in order to ensure sufficient stiffness of the slide element 16, in particular a carbon fiber fraction of 30%.

In order to additionally reduce the friction between a toothed rack and the thrust piece 10 or the slide element 16, channel-like depressions 20 are arranged on the contact surface 18 of the slide element 16, which depressions 20 may be filled with a lubricant.

Since high forces act on the toothed rack during driving operation, which forces are in part transmitted onward to the thrust piece 10, a situation may arise in which, during driving operation, the thrust piece 10 is pressed with its circumferential wall 22 against the housing 14. This can give rise increasingly to friction forces between the thrust piece 10 and the housing 14.

In order to keep these friction forces as low as possible, depressions 24 which run in a circumferential direction at least in certain portions are provided on the circumferential wall 22 of the thrust piece 10. The depressions 24 delimit in each case one hollow chamber 26 between the thrust piece 10 and the housing 14. In particular, a contact area between the thrust piece 10 and the housing 14 is reduced by the depressions 24.

To ensure sufficient stiffness of the thrust piece 10, the depressions are interrupted in the circumferential direction by multiple ribs 28 running in a displacement direction of the thrust piece 10. The ribs 28 need not run exclusively in the displacement direction of the thrust piece 10 but may also be inclined, as shown in the figures.

The stiffness of the thrust piece 10 may also be promoted through suitable material selection. For example, the thrust piece 10 may comprise a glass-fiber-reinforced plastic or be composed of a glass-fiber-reinforced plastic. A suitable plastic is for example polyethylene terephthalate, in particular with a 50% glass fiber fraction.

In addition to the depressions 24, depressions 30 are provided which run in encircling fashion on the circumferential wall 22 of the thrust piece 10 and in which in each case one O-ring 32 is arranged. Rattling noises during driving operation can be dampened by means of the O-rings 32. The depressions 30 can be seen in FIG. 2.

Furthermore, a large-area depression 25 is provided which surrounds some of the depressions 24, such that a stepped depression is formed by the depression 25 together with the depressions 24 that are situated within the depression 25. By means of the depression 25, a contact area of the thrust piece 12 with respect to the housing 14 can be further reduced, which also has an advantageous effect on the friction between the thrust piece 10 and the housing 14. The depression 25 has a considerably smaller depth than the depressions 24, for example a depth of less than 1 mm. In this way, the depression 25 has no significant influence on the stiffness of the thrust piece 20.

The upper edges 36a, 36b of the thrust piece 10 and the corresponding edges 38a, 38b of the slide element 16 are flattened. In this way, the thrust piece 10 is adapted to the shape of the housing 14.

Furthermore, the thrust piece 10 has, in particular on its main body 12, two oppositely oriented flattened portions 37, one of which can be seen in FIG. 1. The flattened portion 37 is situated in the region of a tool parting point. Since the thrust piece 10 is spaced apart from an inner wall of the housing 14 in the region of the flattened portion 37, undesired friction that could be caused by a casting seam or a casting burr is prevented in a simple manner without the need for finish machining of the thrust piece 12, in particular of the main body 10.

Figure 2:
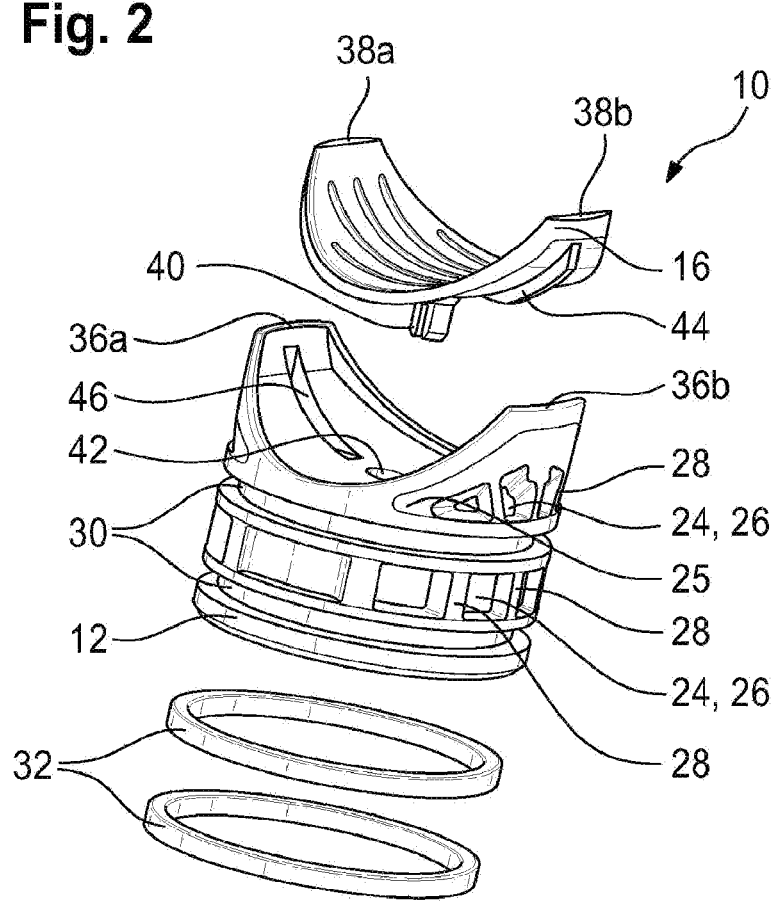
FIG. 2 shows the thrust piece from FIG. 1 in an exploded illustration.

FIG. 2 shows the thrust piece 10 from FIG. 1 in an exploded illustration. It can be seen in this illustration that a fastening element 40 is arranged on a surface, facing toward the main body 12, of the slide element 16. The fastening element 40 may engage into a corresponding recess 42 of the thrust piece 10 and be clamped in the recess 42.

In the illustrated embodiment, the fastening element 40 comprises two flexible lugs which can be pushed together to a certain extent and can thereby give rise to a clamping force.

Additionally, on that surface of the slide element 16 which faces toward the thrust piece 10, there are arranged ribs 44 which can engage into corresponding slot-like depressions 46 on the thrust piece 10. The slide element 16 can be mounted in a rotationally fixed manner by means of the ribs 44.

It is also conceivable for the slide element 16 to be produced as a single piece with the main body 10, for example by means of a two-component injection molding process.

FIG. 3 shows the device 1 in a sectional illustration.

Figure 4:
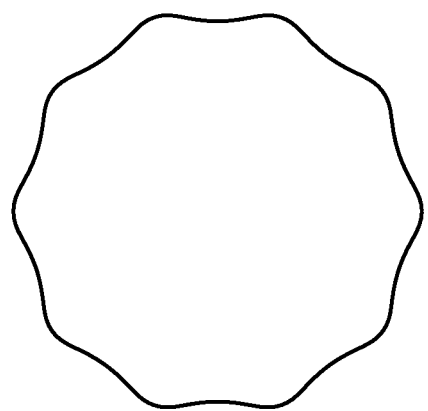
FIG. 4 shows a section through an alternative thrust piece along the line A-A from FIG. 3.

FIG. 4 shows, by way of example, a section through a further thrust piece 10 along the line A-A from FIG. 3, in particular a section through the thrust piece 10 at the level of an encircling depression 30, which is designed for receiving an O-ring 32.

As can be seen in FIG. 4, a depth of the encircling ring-shaped depression 30 may vary in the circumferential direction of the thrust piece 10. In this way, a contact area between the O-rings 32 and the housing 14 is reduced when the device 1 is installed in the intended manner. In a further embodiment, the depth of the encircling depression 30 may be constant, as shown by way of example in FIG. 2.

Figure 5:
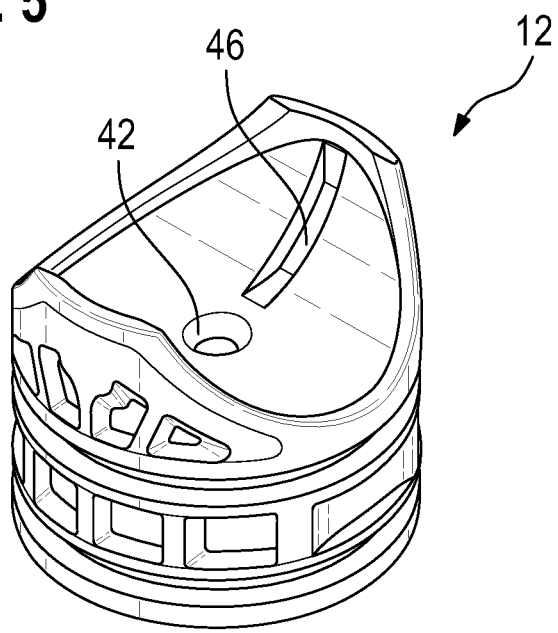
FIG. 5 shows a main body of the thrust piece from FIGS. 1 and 2.
Figure 6:
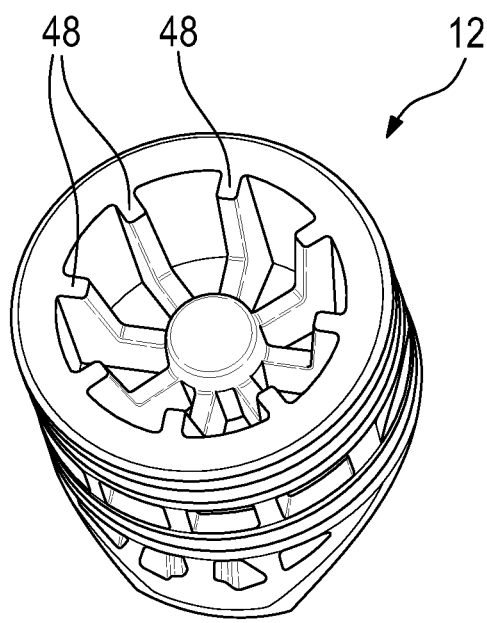
FIG. 6 shows the main body from FIG. 5 in a view from below.

FIGS. 5 and 6 show the main body 12 of the thrust piece 10 in each case in different views.

FIG. 5 once again shows, in detail, the receptacle for the slide element 16 with the recess 42 and the slot-like depressions 46.

FIG. 6 shows the main body 12 of the thrust piece 10 from a side averted from the slide element 16. The thrust piece 10, in particular the main body 12, is hollow proceeding from the side facing toward the slide element 16. In this way, a spring can be partially received in the thrust piece 10, which spring loads the thrust piece 10 against the toothed rack with a force.

Here, radial ribs 48 extend inward from the circumferential wall. Said ribs serve for stiffening the thrust piece and for orienting the spring.

The thrust piece 10, in particular the main body 12, preferably has a substantially homogeneous wall thickness. In this way, the formation of sink marks during the manufacture of the thrust piece 10 can be avoided. The thrust piece 10 is preferably an injection-molded part.

Figure 7:
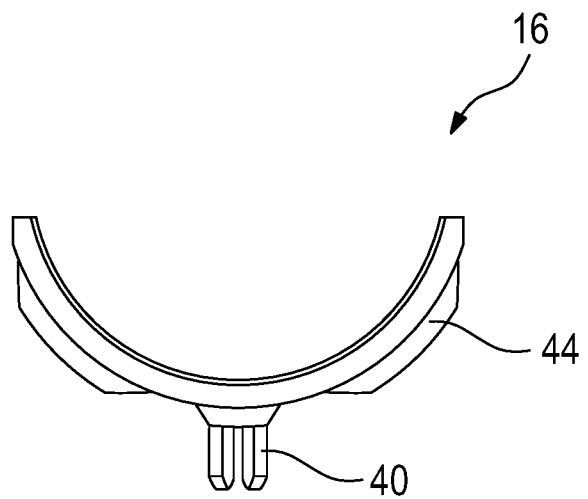
FIG. 7 shows a slide element for the thrust piece as per FIG. 1.

FIG. 7 shows the slide element 16 in a side view.

Figure 8:
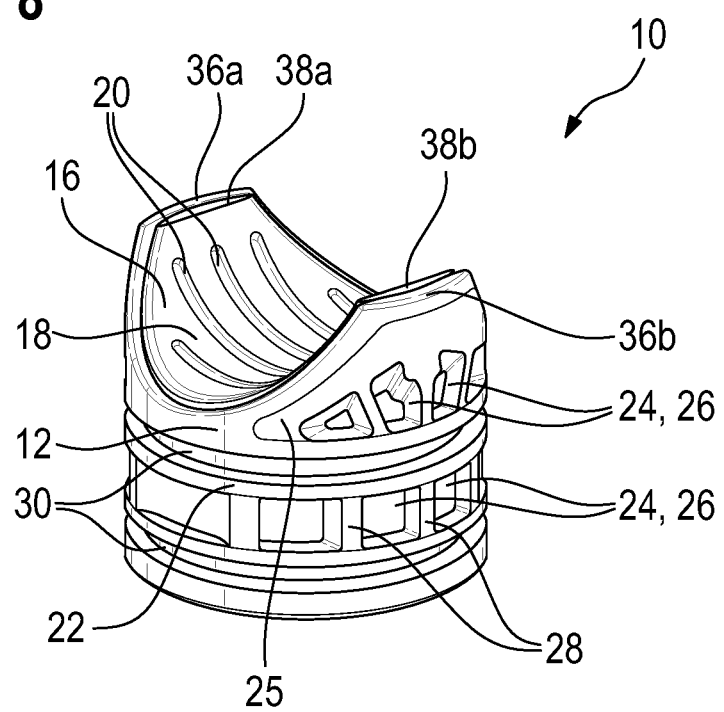
FIG. 8 shows a further alternative thrust piece for a device according to the invention.
Figure 9:
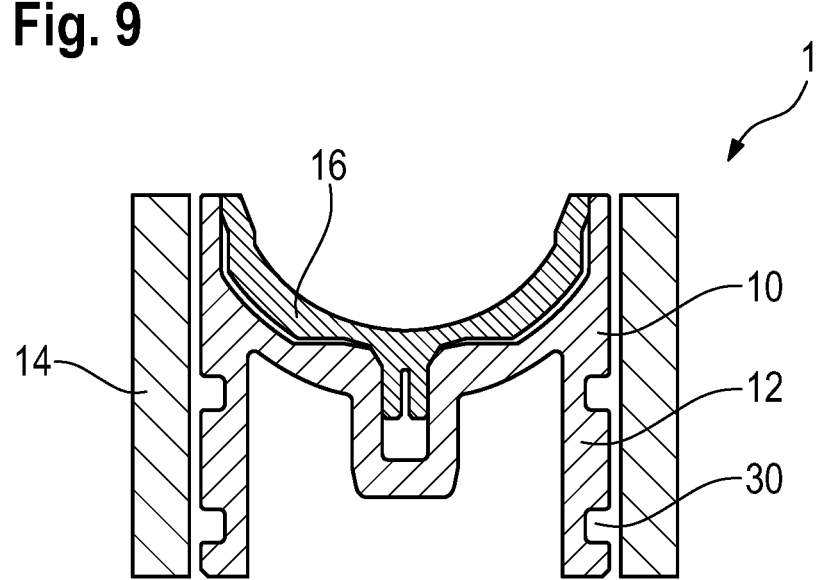
FIG. 9 shows a device according to the invention with the thrust piece from FIG. 8 in a sectional illustration.

FIGS. 8 and 9 show a further embodiment of the thrust piece 10 for a device 1 according to the invention. The thrust piece 10 according to this embodiment differs from the above-described embodiment substantially by the omission of the O-rings 32.

Instead, two depressions 24 are provided which run in encircling fashion in the circumferential direction and which likewise form a hollow chamber between the thrust piece 10 and the housing 14. In this way, friction between the housing 14 and the thrust piece 10 is further reduced.

In both cases, the encircling depressions 30 are arranged in alternation, in the displacement direction of the thrust piece 10, with the depressions 24 which run in encircling fashion in certain portions. This is advantageous with regard to the stiffness of the thrust piece 10.

What is claimed is:

1. A device for a steering system of a motor vehicle for pressing a toothed rack against a drive pinion, the device having a housing and a thrust piece which is mounted displaceably in the housing and which has a circumferential wall which is in contact with the housing, the thrust piece having opposite terminal ends spaced from one another in a displacement direction of the thrust piece, the thrust piece having, on its circumferential wall, chamber depressions which run in a circumferential direction at least in certain portions, each chamber depression being spaced in the displacement direction from each of the terminal ends and delimiting a hollow chamber arranged between the thrust piece and the housing, the chamber depressions being radially recessed into the circumferential wall of the thrust piece such that each chamber depression has a single open end and is directly bounded by portions of the thrust piece on all other sides, the single open end of each chamber depression facing in the radial direction, the circumferential wall having a fully encircling ring-shaped depression interposed, in the displacement direction of the thrust piece, between at least two chamber depressions.

2. The device as defined in claim 1, wherein at least one of the chamber depressions is interrupted in the circumferential direction by at least one rib running in the displacement direction of the thrust piece.

3. The device as defined in claim 1, wherein, around at least one of the chamber depressions, there is arranged an area depression which has a larger area and a smaller depth than the at least one of the chamber depressions.

4. The device as defined in claim 1, wherein the thrust piece comprises a glass-fiber-reinforced plastic or is composed of a glass-fiber-reinforced plastic.

5. The device as defined in claim 1, wherein the fully encircling ring-shaped depression has an O-ring therein.

6. The device as defined in claim 5, wherein a depth of the fully encircling ring-shaped depression varies in the circumferential direction of the thrust piece.

7. The device as defined in claim 1, wherein the thrust piece comprises polyethylene terephthalate with a 50% glass fiber fraction.

8. The device as defined in claim 1, wherein the thrust piece comprises a slide element which provides a contact surface for the toothed rack.

9. The device as defined in claim 8, wherein the slide element comprises polyamide and/or polytetrafluoroethylene.

10. The device as defined in claim 8, wherein the slide element has at least one channel-like depression on its contact surface.

11. The device as defined in claim 8, wherein, on a surface, facing toward the thrust piece, of the slide element, there is arranged a fastening element which engages into a corresponding recess of the thrust piece and which is clamped in the recess.

12. The device as defined in claim 8, wherein the slide element is formed as a single piece with a main body of the thrust piece.

13. The device as defined in claim 8, wherein the thrust piece is hollow proceeding from the side facing toward the slide element, and radial ribs extend inward from the circumferential wall.

14. The device as defined in claim 1, wherein on an encircling outer wall of the thrust piece, there are provided two oppositely oriented flattened portions.

15. The device as defined in claim 1, wherein the circumferential wall has at least one additional fully encircling ring-shaped depression so that the circumferential wall includes a plurality of fully encircling ring-shaped depressions, the ring-shaped depressions being arranged in alternation, in the displacement direction, with the chamber depressions.

16. The device as defined in claim 15, wherein each of the ring-shaped depressions has an O-ring therein.

\* \* \* \* \*